July 29, 1941.   H. O. SCHJOLIN   2,250,656
TURBODRIVE AND CONTROL
Original Filed Feb. 9, 1938   5 Sheets-Sheet 3

Hans O. Schjolin
Inventor
Blackmore, Spencer & Flint
Attorneys

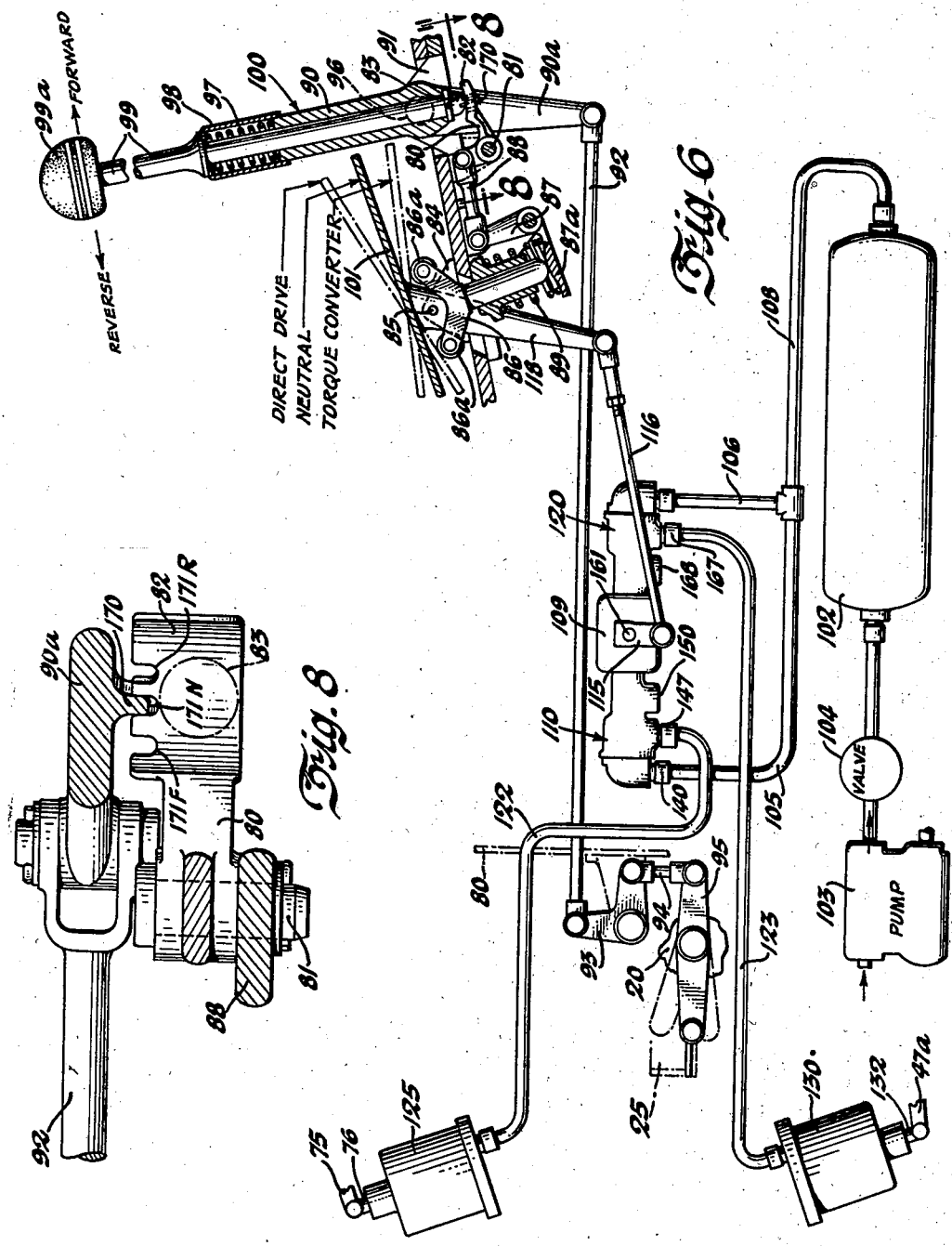

Patented July 29, 1941

2,250,656

UNITED STATES PATENT OFFICE 2,250,656

TURBODRIVE AND CONTROL

Hans O. Schjolin, Pontiac, Mich., assignor to Yellow Truck & Coach Manufacturing Company, Pontiac, Mich., a corporation of Maine Original application February 9, 1938, Serial No. 189,596. Divided and this application August 26, 1940, Serial No. 354,310

4 Claims. (Cl. 74—189.5)

The invention relates to motor vehicles, and more particularly to an improved compact grouping of the driving mechanism for large, heavy vehicles, such as buses, trucks and tractors, as shown in my application S. N. 189,596, filed February 9, 1938, of which the present application is a division.

In passenger buses in particular it is essential to arrange the drive mechanism in a space which shall detract the least from the pay load space, and while vehicles having transversely mounted power plants at the rear are known in the art, the present invention embodies a specific, improved arrangement, which, while including structures for the most part in general use and of conventional character, my arrangement imparts the drive to the vehicle wheels through a system which provides the least wastage of effort in power conversion from a transversely driving and torque converting assembly, in that the final output shaft receives its drive from the main centerline of the primary drive assembly.

A further novelty herein is the adaptation of the turbine form of torque-converter to the above noted form of drive, so that there is the least wastage of axial space consumed by the primary power group; the added utility of providing for accessibility for replacement and assembly of the groups, and the novel nature of the power plant combination which provides adequate accessory unit drive at the end of the primary power group remote from the engine.

Further objects in the application of operator-operated interlocking controls for the above forms of driving mechanism are achieved herewith, in the prevention of wrong motion, and in the coordination of foot and hand operated elements, wherein the said interlocking means are connected with fluid pressure servo devices to accomplish the shifts of drive between direct and converter positions.

Additional objects and advantages will appear in the following detailed description when considered in connection with the accompanying drawings wherein—

Figure 6 is an operation diagram, schematic insofar as the general arrangement of the control elements are concerned, but giving the operator's hand and foot operated controls in elevation and part section.

Figure 8 describes in detail the interlocking arrangement of Figure 6 between the hand control and the pedal control, and is a view taken generally at 8—8 of Figure 6.

Figure 1:
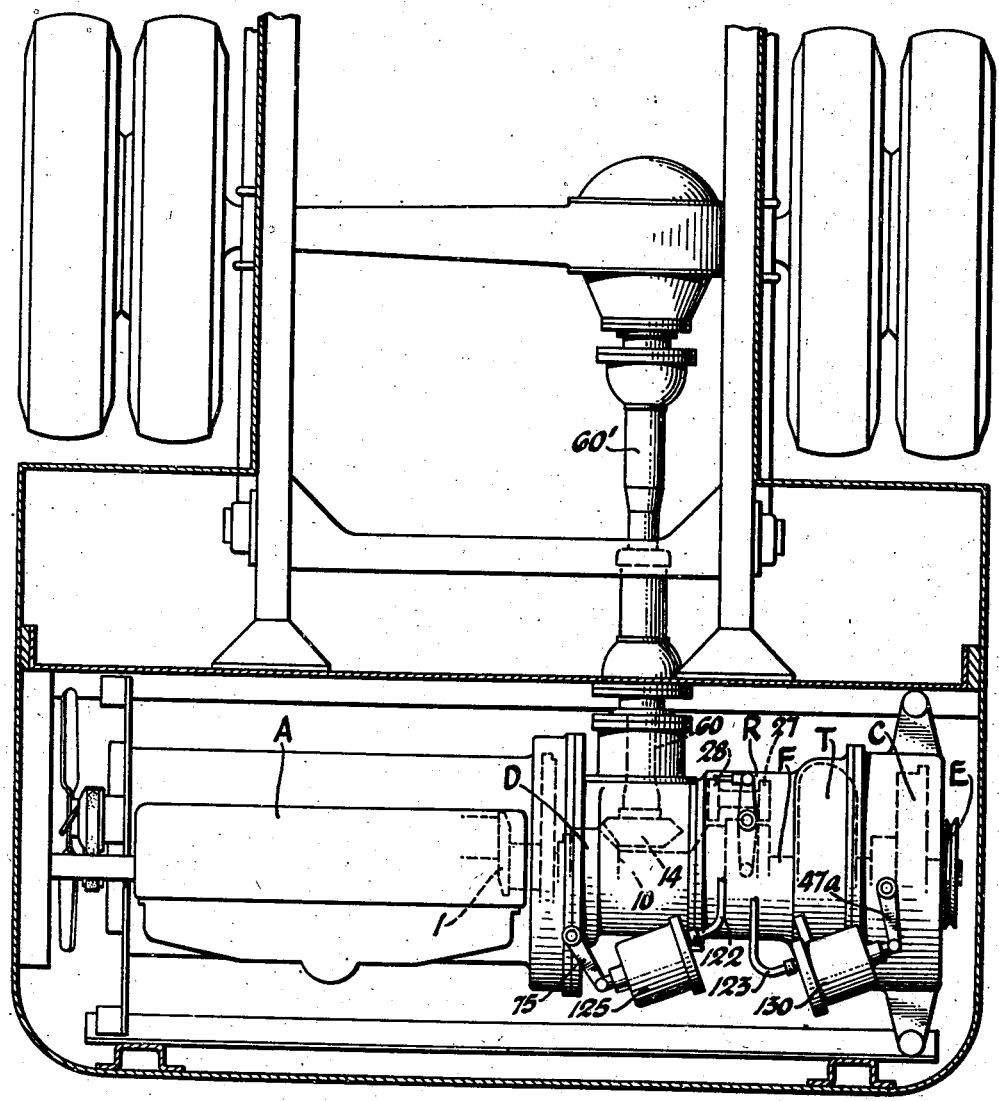
Figure 1 is a schematic view of my invention, as applied to a motor vehicle such as a bus, wherein the power plant is arranged transversely at the rear.

Referring particularly to Figure 1, it will be seen that my arrangement is shown as installed in the rear of a bus, with the primary power plant arranged transversely, and the output drive in the fore-and-aft plane of the vehicle, connecting by a short jackshaft to the conventional differential gear and axle drive to the rear wheels.

The primary power plant comprises an engine A of suitable type, a clutch C, a clutch D, a turbine type torque-converter T as a variable speed transmission, a gear assembly R, an overrunning device F, and an accessory drive mechanism E, all mutually coaxial.

The propeller shaft 60' extends forwardly with respect to the vehicle, and downwardly, from a point intermediate the engine A and the torque-converter unit T, connecting to the conventional differential gear, as noted.

Figure 2:
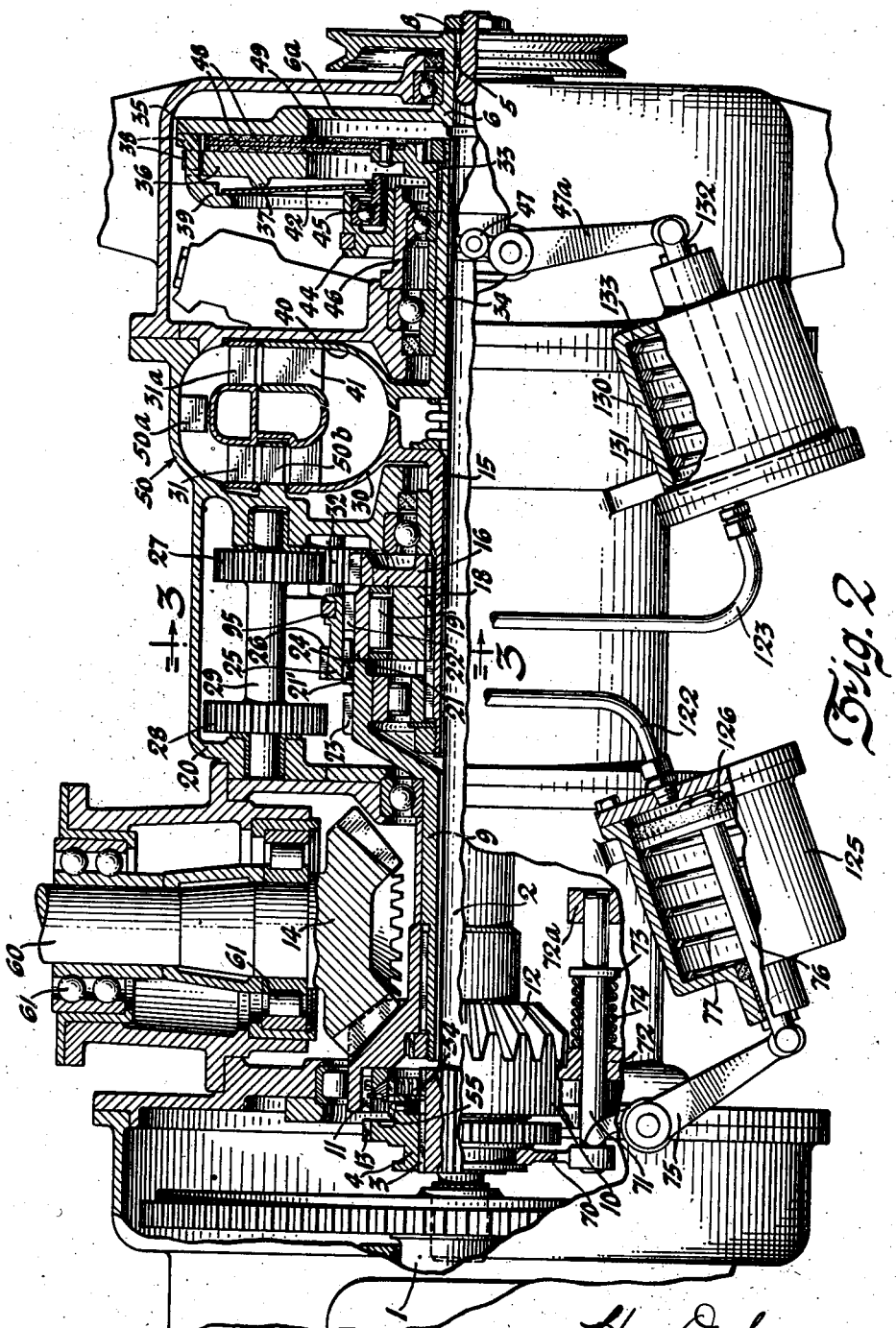
Figure 2 is a longitudinal section of the primary power plant and driving assembly taken in a longitudinal plane of Figure 1.

In Figure 2 the engine crankshaft is shown at 1, mounted to rotate drive shaft 2 splined at 3 for slider 4, and splined at 5 for hub 6 and flange fitting 8.

Sleeve 9 mounted on bearings, surrounds shaft 2 and is attached to or integral with member 10, which has internal ring of teeth 11 and external bevel teeth 12.

The teeth 13 of slider 4 mesh with 11, whereupon member 10 is driven at engine speed.

Output jackshaft 60 rotating in bearings 61 in casing 20 is fixed to or integral with bevel gear 14 meshing with gear 12, transmitting the drive of sleeve 9 to the driving wheels of the vehicle, as shown in Figure 1.

Sleeve 15 concentric with sleeve 9 is bearing mounted on shaft 2 and has affixed gear 16 and roller clutch race 18, its inner end terminating in turbine element 30, which is the output member of the turbo torque-converter T. The outer roller clutch member 21 is externally splined at 22, and teeth 23 and spline 24 of sleeve 9 are aligned axially and radially therewith. Bridging slider 25 is splined internally at 21' so that when these teeth are in mesh with the teeth 23 of sleeve 9, the outer member 21 of the roller clutch assembly F is released. External teeth 26 of slider 25 are arranged to mesh also in the leftward position with the teeth 28 of gearbody 29 rotating in appropriate bearings in casing 20. Teeth 27 of gearbody 29 constantly mesh with reverse idler gear 32, which in turn mesh with gear 16. When slider 25 is in the right hand position of the figure, the drive from sleeve 15 is through roller clutch members 18 and 21 to slider 25, since internal splines 21' are then meshed with teeth 22 and thence from slider 25 to sleeve 9, yielding "forward" drive. When the slider 25 is in the left hand position, the drive is through gears 16—32, gearbody 29, slider 25 and sleeve 9 through the described toothed elements, yielding "reverse drive," which is obvious from the pairing of the gearing.

The hub 6 is one member of the turbine driving clutch C, and hub 33 is the other, splined on sleeve 34, integral with the input or impeller member 40 of the torque converter T.

The blades 50a and 50b are integral with reaction member 50 attached to, or integral with casing 20.

The rotation of impeller 40 causes the liquid contained in the casing to impinge on the blades 31a against which the liquid is thrown by centrifugal force from buckets 41 of the impeller 40. The specialized contour of the blades 50a and 50b permits the liquid to apply a rotational force to output-connected blades 31 and 31a mounted in rotor 30 attached to sleeve 15.

The multiplication of torque achieved in the turbine by virtue of the presence of the reaction members 50a and 50b is a well-known effect, described in U. S. 1,199,359 to Föttinger, filed June 19, 1906, issued September 26, 1916; and no invention is herein claimed for this characteristic.

It is deemed sufficient to state that the three elements of the turbine device constitute a multiplier of torque imparting a variable speed to sleeve 15 from sleeve 34 rotating at engine speed.

When clutch C is engaged, the drive of the engine is transmitted to jackshaft 60 through the torque converter T at variable torques and speeds.

When clutch D is engaged, the drive is transmitted at a fixed ratio from engine shaft 1 to jackshaft 60; whereupon both members, input sleeve 34 and output sleeve 15, of the torque converter T may come to rest, since roller clutch F permits sleeve 9 to overrun sleeve 15.

Figure 3:
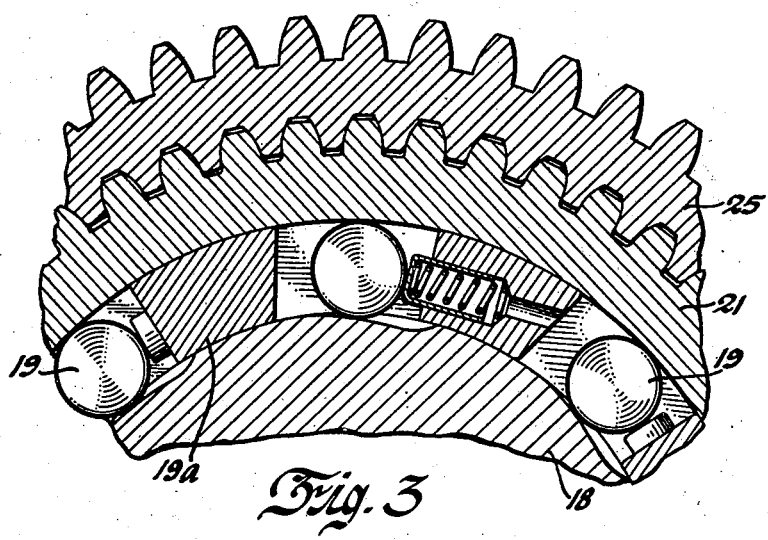
Figure 3 shows the sectional detail of the form of one-way clutch utilized in the assembly of Figure 2 on line 3—3, with shifter engaged.

The detail of roller clutch F is shown in Figure 3, and since this type of structure is well known, no lengthy description of its operation is believed necessary in the demonstration of my invention. It is worthy of note that the arrangement of the outer member 21, inner member 18, sleeve 15, and slider 25 constitutes a means for obtaining a full release of the roller clutch F when the slider 25 is placed in the "reverse" position. The arrangement permits the saving of power plant length by mounting the transfer control for forward, reverse and neutral drive between the toothed ends of the gearbody 29.

The inner face of the outer member 21 is smooth, and acts as a race for rollers 19 carried in cage 19a rotating with the inner one-way cam member 18. The rollers are biased by appropriate means, for one-way locking of members 18 and 21. The cage 19a has limited lost motion with respect to member 18.

The neutral position of the slider 25 occurs when the teeth 21' are demeshed from spline teeth 22 of element 21, partially meshed with teeth 23; but without mesh between teeth 26—28.

Figure 4:
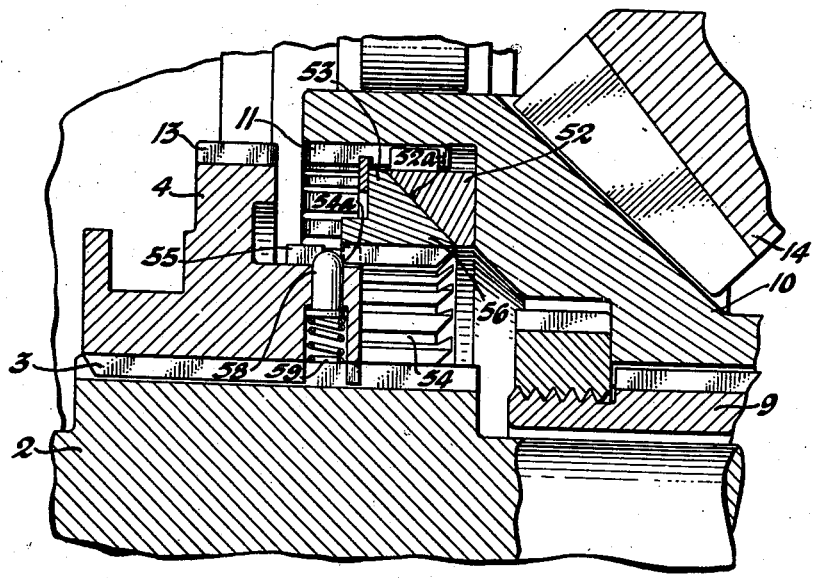
Figure 4 is an enlarged view of the direct drive clutch D of Figure 2.

The detail of one form of clutch D is shown in Figure 4 where slider 4 splined at 3 to shaft 2 may mesh its teeth 13 with teeth 11 of bevel gearbody 10. Inside the overhang of teeth 11 is located friction ring 52, locked to rotate with member 10, and presenting tapered friction face 52a.

Balk piece 53 is splined at 54 to an extension of slider 4, for limited rotational motion with respect to slider 4. Auxiliary teeth 54a—55 cut on slider 4 are spaced to accommodate poppets 58, which are loaded radially by springs 59 in the radial recesses shown. The poppets 58 transmit axial force on slider 4 toward mesh of teeth 13—11, to the adjacent edge of spline teeth 54a of balk piece 53, so that registry of the teeth of 54—55 will coincide with release of drag force, permitting 13—11 to mesh without clash. Additional force is needed to depress the poppets for completion of mesh.

Piece 53, because of friction contact of its ring 56 with ring 52 at 52a, may then rock positively or negatively on the splines 54, so that teeth 54a of piece 53 will be out of registry with teeth 55, the teeth ends abutting, preventing further motion toward mesh of slider 4 and teeth 13.

If the faster member be the engine shaft 1 the balking piece 53 will rotate positively due to friction drag, to set up rejection of mesh. If output connected member 10 be the faster member, in either case there is rejection of mesh until the drag force acting on piece 53 disappears, as it does at synchronism, when the slider 4 may now move, teeth 55 may enter spline teeth 54a of piece 53, and also teeth 13 mesh with teeth 11, whereupon direct drive between shaft 1 and member 10 is accomplished.

During the asynchronous rotation interval of slider 4 and member 10, the opposing force condition persists, until synchronism is reached. Then the drag force from ring 52 to ring 56 disappears, which because of the release of the balking action, permits further free travel toward mesh, thereby allowing teeth 13—11 to complete meshing engagement.

This is described as a form of synchronism responsive mechanism having a balking, or rejection-of-mesh characteristic, wherein the friction and camming forces are provided to control the mesh motion rather than to absorb the differential inertias of the engine and vehicle. The characteristic may be described as a friction balking or lock-out action arranged to permit mesh or reject mesh, according to synchronous or asynchronous rotations of the two members to be connected for unitary rotation.

It should be emphasized that if the driver allows engine speed to fall off below synchronism before the shifting force is exerted on the slider 4, the relative rocking action of balk piece 53 would be reversed, and the device would reject mesh because of the lag of teeth 55 with respect to teeth 54. The operator need therefore only bring the engine speed up to synchronism by depression of the accelerator pedal, whereupon, as before, the completion of mesh is permitted.

As will be seen, this form of synchronism responsive device is needed for clutch D to operate correctly in combination with the controls for the turbine torque converter.

The form of clutch C shown in Figure 2 is that of a single-plate friction clutch in which flange 6a of hub 6 terminates in drum 35 in which presser plate 36 is allowed limited longitudinal motion on splines 38. Disc spring 42 held by ring 39 to drum 35 extends inwardly toward hub 33 and may engage projection 37 of presser plate 36. The inner portion of spring 42 engages sleeve 45 movable longitudinally so as to shift the inner part of the spring 42 to either side of its critical flexion position with respect to the clamped outer edge.

When the sleeve 45 is positioned to the right, as in Figure 2, the external force applied to sleeve 45 shifts spring 42 through its critical flexure position, whereupon the force of the spring is exerted on projection 37, tending to load presser plate 36. Hub 33 carries the driven element 49 of clutch C to which the customary facing discs 48 are affixed. When plate 36 is loaded, clutch C transmits the drive of shaft 2 to the input member 40 of the torque converter T, at a given clutch capacity.

When the external force shifts sleeve 45 to the left, the spring 42 is anew flexed through the critical position, and its force is dissipated in holding the presser plate 36 free from load, thus declutching clutch C.

It should be noted that the external force to be applied to sleeve 45 need only be effective to carry the spring 42 through the critical midposition, and that no external force thereafter is needed to hold the clutch C engaged or disengaged.

External controls for clutches C and D, alternating their engagement, may therefore connect the drive for variable speed and torque through the converter unit T, or for fixed ratio or "direct" drive.

Figure 5:
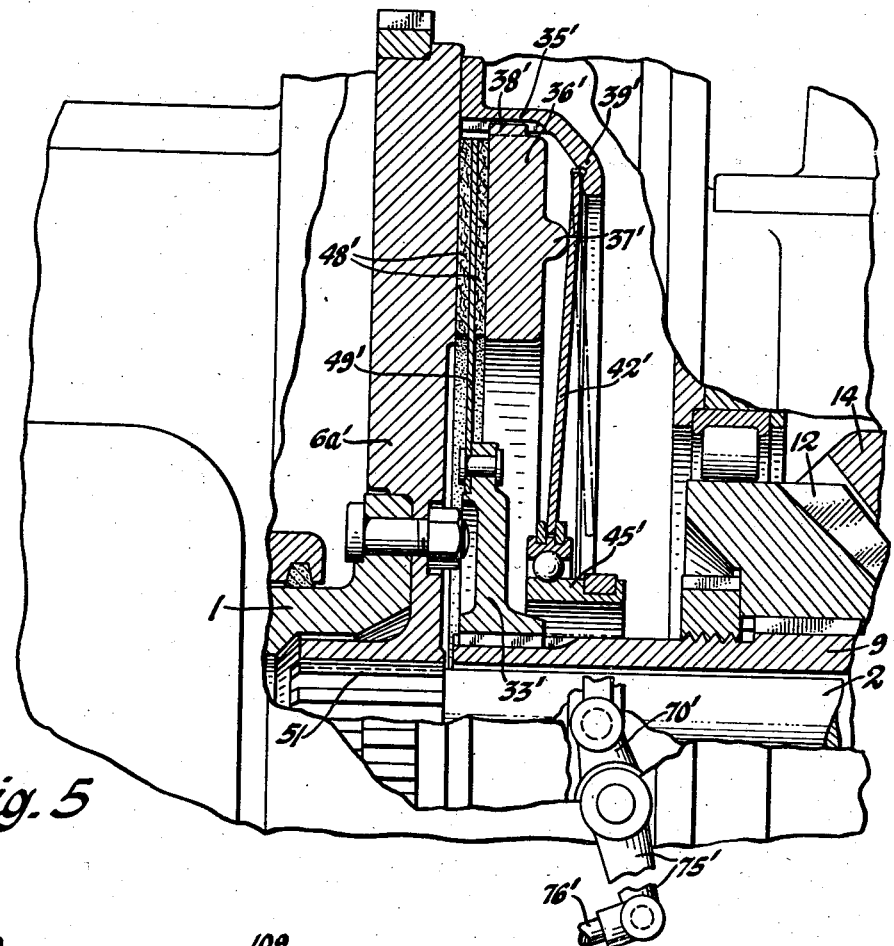
Figure 5 is an elevation-section view of a friction clutch used as a modification of the direct drive clutch of Figures 2 and 4, and identical in construction with the friction clutch C of Figure 2.

In Figure 5 the clutch assembly D takes the form of a friction clutch, identical in operation with that of the clutch just above described, and shown as connecting shaft 2 and sleeve 9. The prime-numbered elements of Figure 5 correspond to the parts described above in conjunction with the turbine driving clutch C of Figure 2.

Referring back to Figure 2, the collar of slider 4 is intersected by fork 70 affixed to rod 71 having sliding bearing in casing extensions 72 and 72a. Lock ring 73 retains biasing spring 74 which normally urges slider 4 toward engagement of teeth 13—11. Rocker lever 75 pivoted on the casing is arranged to load the slider 4 for disengagement through piston rod 76 and piston 126 of air cylinder 125 mounted on the casing 20 when air is admitted to pipe 122, to overcome the tension of return spring 77.

At the right of Figure 2, the casing 20 is shown broken away to disclose the external control applied to collar 44 which moves clutch sleeve 45 splined on casing extension 46. Fork 47 pivoted to the casing 20 is moved by its external lever 47a pivoted to piston rod 132 attached to piston 131 of cylinder 130 mounted on the casing 20. When air is admitted to pipe 123 and cylinder 130, collar 44 and sleeve 45 are moved toward the left. When air pressure is released therefrom, return spring 133 in cylinder 130 shifts collar 44 and sleeve 45 to the right. The servo actuation means are shown schematically, and may be so disposed in the engine compartment space as engineering requirements demand. The detail of the servo control system is given further in this specification.

The prime-numbered elements in the lower half of Figure 5 refer to identical parts in the control for clutch D of Figure 4, the arrangement for Figure 5 being identical with that for clutch C of Figure 2.

Figure 6 describes the remote control system for clutches C and D, whereby the operator may at will select and operate the drive through the torque converter, or in direct.

The driver controls consist of a gearshift lever assembly 100 mounted to rock longitudinally between three positions, forward, neutral and reverse; and pedal 101 having three operative positions; direct for actuation of clutch D, neutral, and the fully depressed position for putting in clutch C which drives the torque converter T.

Figure 7:
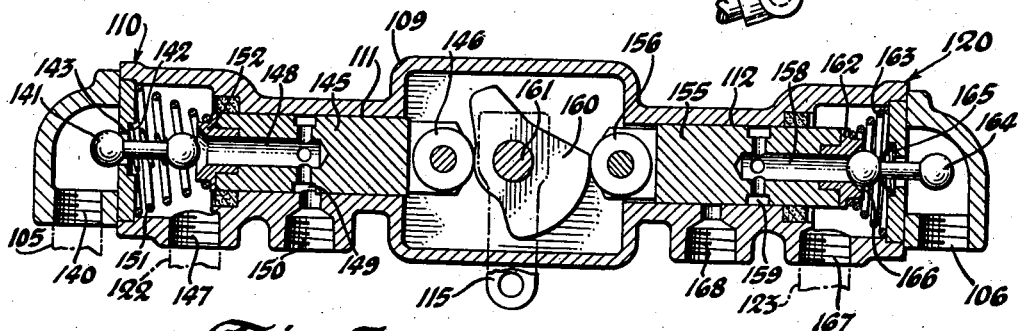
Figure 7 is a longitudinal section of the servo control valving of Figure 6.

The system of the demonstration includes air servo means consisting of reservoir 102, maintained by the customary air pump 103 and automatic cut-off valve 104; air pressure feed pipes 105 and 106 connected to air main 108, valve assembly 110 controlling pressure to operate the control for clutch D; and valve assembly 120 controlling pressure to operate the control for clutch C, as shown in Figures 6 and 7.

The valve assemblies 110 and 120 are fitted to bores 111 and 112 respectively, in valve casing 109, and are operated by mechanism shown in detail in Figure 7, having external lever 115 and link 116 moved by lever 118 of pedal 101. When the pedal 101 is depressed to the "torque converter" position indicated, lever 118 swings clockwise from the position shown; and valve assemblies 110 and 120 admit atmosphere to lines 122—123 and to cylinders 125—130 in which pistons 126 and 131 slide. As will be seen later, the spring 133 of Figure 2 tends to engage clutch C, establishing drive through the converter T.

When pedal 101 returns to the "neutral" position shown, valve assembly 120 cuts off the atmosphere from line 123, and applies pressure to cylinder 130 so that clutch C is now disengaged, flexing spring 42 to the left side of its critical position.

Movement of the pedal 101 to the direct drive position rocks levers 118 and 115 counterclockwise, so that both valve assemblies 110 and 120 admit air pressure from line 108 to lines 122—123 and to cylinders 125—130. Piston 126 is arranged to permit spring 74 to load the slider 4 of Figure 2 toward engagement; or to shift the sleeve 45' of Figure 5 toward clutching engagement. Piston 131 maintains pressure on spring 133, but spring 42 being flexed to the left of its critical position is not thereby loaded.

When pedal 101 returns to the "neutral" position shown, valve assembly 110 cuts off the air pressure from line 105 and vents cylinder 125 and line 122 to atmosphere, so that clutch D may be disengaged, through the relieving of load on spring 74 in the instance of the jaw clutch slider of Figure 1; or the action of spring 77', in the case of the modification of Figure 5.

The shifter lever member 90 is pivoted in fitting 91 fastened to the floor of the driver's compartment, and its extension lever 90a is pivoted to rod 92 extending to the rear of the vehicle, to bellcrank 93 mounted on the bulkhead 180. The other end of bellcrank 93 is pivoted to rod 94 movable parallel to the bulkhead; the rod 94 being in turn pivoted to rocking lever 95 pivoted on the casing 20 of the power plant. The opposite end of lever 95 projects into the casing 20 and is forked to operate the slider 25 of Figure 2.

Tracing out the motion, one will observe that the lever assembly 100 rocked counterclockwise exerts a pull on rod 92, rocking bellcrank 93 clockwise, and through rod 94, rocking lever 95 clockwise. The forked end of lever 95 then has shifted slider 25 of Figure 2 to reverse driving position. When the lever 100 is rocked clockwise, rod 92 receives a thrust, and bellcrank 93 and lever 95 rock counterclockwise; which, upon comparison with Figure 2, causes slider 25 to uncouple the reverse driving gearing 23—28—27—16, and reconnect sleeve 9 with member 21—25.

Since it is desirable that the operator be enabled to compel not only a neutral position of slider 25 but also a neutral drive for both clutches C and D, the lever 100 is of composite form, being normally held in an extended position from the pivot 96 of fitting 91, by spring 97 enclosed in sleeve 98.

The shifter lever rod 99 fits loosely in a recess of the lever 90, and projects through the pivot center 96 to the underside of the floorboard.

Bellcrank 80 pivoted at 81 is shaped at 82 to intersect the movement of the end 83 of rod 99.

The pedal 101 is mounted in pivot fitting 84—floorboard, at 85.

A bridle or yoke 86 is arranged to slide in an aperture in the floorboard in a plane intersecting the "neutral" pedal position at right angles. Each leg of the yoke 86 is equipped with a roller 86a so that when the yoke 86 is pressed upward, the pedal 101 will be positioned at "neutral," whether it has been in direct or in the "torque converter" control positions.

Bellcrank 80 is linked to bellcrank 87 by the short rod 88, and 87 terminates in a cam foot 87a which intersects the motion of the rod end of yoke 86. Spring 89 bears against the floorboard fitting 84 and against cam foot 87a so that, normally, the pedal is free to move without interference by the bellcrank 87.

Whenever the driver depresses the knob 99a and rod 99 to compress spring 97, the above described bellcrank system becomes active, spring 89 is also stressed, so that unless the pedal 101 is already in the "neutral" position, the resulting clockwise rocking of the bellcranks 80 and 87 will shift the yoke 86 to neutral-compelling position.

It is realized, of course, that the previously described valve motions, in connection with the control movements of the pedal 101 will therefore ensue, when the shifter lever assembly 100 is manipulated as above described.

Figure 7 provides a sectional detail describing a specific form of valve mechanism used herewith as an example of the principles of the invention.

At the left the valve casing 109 is equipped with nipple 140 joined to pipe 105 leading from the pressure source. Dumbbell valve 141 held by small spring 142 normally seals port 143 in casing 109.

In description of the valve assembly 110, bore 111 is occupied by valve body 145 having pivoted roller 146 at its right end. The valve 145 is centrally drilled at 148 and communicates with annular port 149 which may intersect atmospheric port 150 cut in casing 109. The hardened seat 152 is held on the spindle end of valve 145 by conical spring 151 which normally acts to cause valve 145 and roller 146 to follow cam 160.

Tapered seat 152 at valve 148 may be sealed by the adjacent end of the dumbbell valve 141 at full stroke.

Servo port 147 connects to line 122, and to cylinder 125 of the direct drive clutch D.

When the valve 145 is as shown in Figure 7, spring 151 is active, cam 160 is out of the way, air pressure in line 105 seals port 143 with dumbell valve 141 assisted by spring 142, and the servo line 122 and cylinder 125 are vented through port 147, passage 148, port 149 and port 150.

When cam 160 stresses spring 151, shifting valve 145 to the left, port 149 is out of registry with port 150, and ground seat 152 intersects valve 141, unseating it, and admitting air pressure from line 105 and nipple 140 to port 147 and line 122. As has been noted, this position corresponds to the shift from "neutral" to "direct drive" of pedal 101, which through the linkage 118—116—115, rocks shaft 161 and cam 160, to move roller 146 and valve 145.

Similarly, in description of valve assembly 120, valve 155 in bore 112 of casing 109 is equipped with roller 156, has central port 158 communicating with port 159 and carries ground seat 162 held by conical spring 163. Dumbell valve 164 is normally loaded by spring 165 to seal pressure port 166 connected to nipple 167 of line 123, and is unseated at full stroke of valve 155. Atmospheric port 168 in casing 109 may intersect port 159 of valve 155; and vent servo port 167, line 123 and cylinder 130 of the torque converter clutch C.

When the valve 155 is as shown in Figure 7, the cam 160 is active, spring 165 is compressed, ground seat 162 has intersected the dumbell valve 164 sealing off the central passage 158, opening pressure porting 106 to the servo line 123, and the annular port 159 has shifted out of registry with the atmospheric port 168. In this position, the conditions correspond to the positioning of pedal 101 at "neutral drive."

The contouring of the cam 160 is such that when the clutch C is engaged, as when pedal 101 is in "torque converter" position, that is, fully depressed, both valve 145 and 155 are positioned for atmosphere to enter both cylinders 125 and 130; when it is in "neutral" position, valve 145 admits atmosphere to cylinder 125, but valve 155 admits reservoir pressure to cylinder 130; and when it is in the "direct drive" position, both valves 145 and 155 admit reservoir pressure to both cylinders 125 and 130.

In the case of the modification of Figure 5 where the jaw clutch of Figure 4 is replaced by the friction clutch for direct drive, the sleeve 45', which stresses spring 42', is arranged so that when servo pressure in cylinder 125 is exerted, the spring 42' is positioned to flexibly load projection 37' of pressure plate 36'. When the air pressure is relieved, spring 77' may overcome the force of 42' and disengage the clutch D.

When the operator is driving the vehicle in direct drive, the air pressure is therefore maintaining the sleeve 45' of the clutch D in engaged position, and clutch C is disengaged. If there be a demand for acceleration at a lower speed ratio than 1 to 1, the operator will depress pedal 101 to "torque converter" position. Valve 145 first cuts off the servo pressure from cylinder 125, as the pedal 101 passes through "neutral" position; and spring 42 being shifted by spring 133, flexes away from the presser plate 36', and clutch D becomes disengaged.

When the pedal reaches the "torque converter" position, valve 155 moves to cut off servo pressure from cylinder 130, which vents to atmosphere, and spring 42 of clutch C is shifted so as to load the presser plate 36, and thereby establish drive through the clutch plate 48 and the torque converter T of Figure 2.

The relative biasing shown for the clutches for engagement and disengagement is believed to be novel, providing advantages in smooth operation, safety and the ability to maintain operation regardless of failure.

Further modification may be made of the relative action of the clutch control members with respect to the inherent characteristics of the disc spring actuating clutch controls, without departing from the scope of my invention.

In order to assure the shifter mechanism moved by the operator's control 99 from wrong motion, the shifter mechanism is interlocked, so that the ball 99a and rod 99 must be depressed for each shift among forward, neutral or reverse.

The sectional view of Figure 8 shows lever 90a movable with the rocking shifter motion of rod 99 as shown by the arrows. On the inner face of lever 90a is welded guide key 170. Pad 82 of lever 80 moves in an arc to intersect key 170, and notches 171R, 171N, and 171F respectively, are the positions occupied by the tongue of the key 170 when the handlever assembly 100 is placed in the reverse, neutral and forward positions.

The lever assembly 100 cannot be rocked through these positions until gearshift ball 99a and rod 99 are depressed sufficiently to swing lever 80 and the notches of pad 82 clear of the key 170.

When the new shift is accomplished, the spring 89 returns the lever 80, pad 82 and notches to locking position. This simple interlock is believed an improvement over the customary poppet locking means.

The preceding description is believed to encompass a number of novel features, among which are the synchronized direct engine coupling of Figures 2 and 4, the related control motions of the shifter mechanism which alternates drive between clutches C and D, the novel arrangement of the friction clutch loading and unloading means in conjunction with the alternating control, and the free release mechanism involving the one-way clutch whereby the turbo-driven element may be brought to rest.

From the foregoing, it is apparent that a number of related novelties embodying invention in combination are herewith disclosed. Changes in the specific arrangements and forms of the structures may be made without departing from the spirit and scope of my invention, said invention being limited only by the scope of the appended claims.

Having thus described my invention, what I claim as new and desire to secure by Letters Patent is:

1. In a power transmission having a high speed drive and a variable-speed low speed drive including a hollow shafted driven member, a sleeve member for power take off from the transmission mounted in axial alignment with the hollow shaft part of said driven member, a releasable coupling for selectively transmitting power directly from said driven member to the adjacent end portion of said sleeve member, gearing including an axially shiftable gear for selectively transmitting power in reverse direction from said driven member to the adjacent end portion of said sleeve member, and means including a high speed drive shaft extending through said driven member and said sleeve member, for transmitting drive to the end portion of the sleeve member remote from said driven member.

2. In a power transmission having a high speed drive and a variable-speed low speed drive including a hollow shafted driven member, a sleeve member for power take off from the transmission mounted in axial alignment with the hollow shaft part of said driven member, means comprising an overrunning clutch and a releasable coupling for selectively transmitting drive in one direction only from said driven member to the adjacent end portion of said sleeve member, gearing including an axially shiftable gear for selectively transmitting drive in reverse direction from said driven member to the adjacent end portion of said sleeve member, and means including a high speed drive shaft extending through said driven member and said sleeve member for selectively transmitting drive to the end portion of the sleeve member remote from said driven member.

3. In a power transmission having a high speed drive and a variable-speed low speed drive including a driven member, a power take-off member, means for selectively delivering power through said high speed drive to the power take-off member, means including an overrunning clutch for transmitting drive in one direction only from said driven member to the power take-off member, and means including an axially shiftable gear for selectively transmitting drive in reverse direction from said driven member to said power take-off member independently of said overrunning clutch.

4. In a variable speed transmission, hydraulic power transmitting mechanism including a hollow shafted turbine member adapted to be driven in one direction only, a power shaft extending through said turbine member for effecting drive in the same direction in alternation with the drive transmitted through said turbine member, a driven member, an overrunning clutch for transmitting drive in one direction only from said turbine member to said driven member, and mechanical reverse gear mechanism associated with said turbine member including a driving gear on said hollow shaft part for transmitting drive from said turbine member to said driven member in opposite direction to that in which drive is transmitted by said overruning clutch.

HANS O. SCHJOLIN.